Oct. 24, 1939.　　　B. W. GONSER　　　2,177,104
METHOD FOR MANUFACTURING CAN BODIES
Filed April 16, 1937　　　4 Sheets-Sheet 1

INVENTOR.
Bruce W. Gonser.
BY
Corbett & Mahoney
ATTORNEYS.

Oct. 24, 1939.  B. W. GONSER  2,177,104
METHOD FOR MANUFACTURING CAN BODIES
Filed April 16, 1937  4 Sheets-Sheet 2

INVENTOR.
Bruce W. Gonser.
BY
ATTORNEYS.

Oct. 24, 1939.  B. W. GONSER  2,177,104
METHOD FOR MANUFACTURING CAN BODIES
Filed April 16, 1937  4 Sheets-Sheet 3

INVENTOR.
Bruce W. Gonser.
BY
ATTORNEYS.

Oct. 24, 1939.   B. W. GONSER   2,177,104
METHOD FOR MANUFACTURING CAN BODIES
Filed April 16, 1937   4 Sheets-Sheet 4

INVENTOR.
Bruce W. Gonser
BY
ATTORNEYS.

Patented Oct. 24, 1939

2,177,104

UNITED STATES PATENT OFFICE 2,177,104

METHOD FOR MANUFACTURING CAN BODIES

Bruce W. Gonser, Columbus, Ohio, assignor to Battelle Memorial Institute, Columbus, Ohio, a corporation of Ohio Application April 16, 1937, Serial No. 137,372

5 Claims. (Cl. 113—120)

My invention relates to method for manufacturing can bodies. It has to do particularly with the manufacture of can bodies of sheet steel with or without a protective coating, though it is not necessarily limited to such material.

In the prior art, the vast majority of sanitary food containers, generally referred to as tin cans, are made from thin sheet steel coated with tin. The bodies of these tin cans are ordinarily of cylindrical form and the can is customarily completed by applying disk-like end closures to the open ends of these cylindrical can bodies. Under the practices which are universally in vogue, at the present time, the sheet steel from which the can bodies are made is prepared by either cold rolling steel into strips which ordinarily approximate .01 of an inch in thickness or by the older method of hot rolling packs of steel sheet down to this thickness. The cold rolled strips are cut into sheets and tinned on both sides; the hot rolled sheets are merely trimmed and tinned. Then, these sheets of steel are slit so that their widths approximate the lengths of the desired can bodies and their lengths approximate the circumferences of such can bodies. These pieces are then bent to cylindrical form by appropriate mechanism and their ends connected by a lock-seam, to which solder is applied externally to produce a permanent and air-tight side seam for the can body. In some cases, cans are similarly formed by the use of terne plate instead of tin-plate, the terne plate differing from the tinplate in that the sheet steel has a coating of a tin-lead alloy instead of tin.

As present, all gas tight cans are made of tin plate or terne plate having soldered side seams. The ends may be soldered on but are usually seamed in place with a rubber base gasket to render them gas tight. A few cans are made by stamping and have no seams except at the top, such as salve cans, but these are used only for very special purposes. Some large heavy cans, such as five-gallon oil, grease, and paint cans, are made of black or untinned iron and have welded side seams.

At the present time, these tin can bodies are being made, in certain plants, at a rate of 300 to 325 can bodies per minute. However, for the attainment of this comparatively high rate of production, it is necessary to provide comparatively elaborate automatic machinery, which machinery must be carefully and accurately designed. Such machinery comprises "automatic slitters" for dividing the sheets of tin plate into strips of proper width and length and automatic body making machinery to notch, edge, form, hook, seam, flux, solder and cool can bodies at a rapid rate. The various units of this apparatus must be sturdy and dependable and must be highly synchronized, since pauses of but a few minutes are costly.

The present day manufacturing process for making common sanitary cans is an example of the complexity of such process. In this process, blanks from the slitter are stocked in the magazine of the lock-seam body maker from which they are automatically fed singly from the bottom by means of a vacuum cup. Usually the blanks are fed from vertical stacks, but some machines use an inclined vacuum blank feed with knurled retarding rolls for feeding lithographed sheet. By using a special baked varnish over the lithographed work, however, the normal horizontal vacuum feed can be used.

Reciprocating feed bars carry the body blanks to a station where they are notched and slit at the corners. This is to prevent trouble later in multiple doubling at the side seam when the ends are seamed in place. Sometimes this operation is preceded by a rolling-flexing attachment, which removes irregularities in the blank and tends to work-harden the plate slightly.

The feed bars then convey the blank with a speed which cannot be followed by the eye to the edging station where hooks are formed. These hooks, or turned edges, one up and one down, lengthwise along the can body later form the locked side seam. The blank then arrives at the body-forming station.

Actual forming of can bodies is done either by wing forming, in which case the edges are bent and the hook prefluxed before forming, or by roll forming whereby the body is formed after notching, then edged, prefluxed, and the seam locked. In either case a rosin-alcohol flux is applied to the hooks at the fluxing station. This is applied in such a manner that no flux gets inside the can. Acid fluxes are sometimes used for non-food containers, but are not used unless necessary. They are more positive but more corrosive.

At the forming station the blanks are bent into a cylindrical shape by means of two semi-circular wings, the hooks are engaged by means of an expanding mandrel inside the can, and the seam flattened by a bump from a long, narrow, flat-faced hammer. In the forming mandrel or horn there is a longitudinal groove, in which a hardened spline is fitted which has a groove-shaped member to receive the seam. This gives a smooth or slightly flattened contour to the can body on the outside, the extra room required for the four thicknesses of tin plate at the seam being taken on the inside of the can. Usually the seam is formed on the bottom; for overhead wire soldering, however, the lock-seam is made and bumped at the top of the horn.

After bumping the side seam, the can moves on to the soldering attachment where the outside of the seam is fluxed and the entire seam soldered. Fluxing is rapidly done by a wheel about ⅛ in. wide, which dips into a flux bath and presses lightly against the seam as the can passes overhead. Soldering of the side seam is accomplished by contact between the seam of the can body, as it passes quickly along the solder horn, and longitudinal rolls revolving underneath in a bath of molten solder. A solder containing 40 per cent tin is commonly used. The solder bath, which usually holds 600 to 800 lbs. of solder, is maintained at a constant temperature of about 625° F. for high-speed lines. A lower temperature is necessary when soldering enameled cans than for plain cans. A flux is also used on the solder bath to keep it clean. Can seams may be preheated before soldering and then "sweated" by soldering with open burners.

Excess solder is wiped from the can body by a fabric buffing wheel and the wipings are returned to the solder bath, either directly, or after refining, if contamination is suspected. Ease of soldering is affected by the thickness of tin coating and presence of palm oil. Too thin a coating of tin may give ineffective soldering; palm oil tends to burn off at soldering temperatures and may cause trouble. To avoid scooping too much solder from the rolls, body blanks are placed in the body-maker so that the burred edges arising from slitting the tin plate are on the inside of the can after forming.

Air from a blower operated with the machine is used to cool the soldered seam as it passes along the end of the solder horn. The can body is then ready for the next operation—flanging.

Throughout the early body notching, edging and forming operations, automatic gaging is used at each station to place the blank properly. Difficulties in body making are largely due to too wide a range of tolerances. "Out of square" blanks, burred edges, or double blanks occasionally start through the machines.

It will be apparent that this described apparatus which is commonly used in the prior art is relatively complicated and is expensive. Moreover, the care required in synchronizing the operation of these many units is a drawback from the standpoint of expense and rate of production. Moreover, this prior art method results in certain other drawbacks. For instance, tin plate is comparatively expensive. Tin is an imported metal and one which is considered as an essential war material, largely because of its use in tin plate and solder, so that it would be advantageous to the country to eliminate the use of tin wherever possible. Likewise, tin is not sufficiently protective or has bad effects of its own for some purposes, so that many cans are lined with organic enamels or lacquer.

Solder contains lead, which is a toxic metal. Although not normally dangerous, its presence in food containers is a potential hazard that all canners and health agencies would like to avoid. Likewise, solder is sufficiently expensive that avoidance of its use would be quite desirable.

Moreover, the fact that the edges of the body blank are to be soldered together to form the side seam makes necessary the tinning of the black iron sheets on both sides, since solder does not operate as effectively on the untinned as on the tinned metal.

In order to eliminate the use of solder and the consequent need for using tinned blanks to form the can bodies, some attempts have been made in the past to form the side seam of the cans by welding. Such efforts have ended in failure, largely because of the slow speed of welding. This has been primarily due to the fact that these attempts to weld were made on individual can body blanks. As far as known, the best speeds obtained did not exceed 20 to 25 can bodies per minute, which obviously falls too far short of the present commercial practice of making soldered side seam cans at rates as high as 300 or more cans per minute to offer serious competition therewith.

One of the objects of my invention is to provide a method and apparatus for making can bodies which will be free from the complexities and drawbacks of the prior art methods and apparatus such as have been outlined above and will be much more simple and economical than such methods and apparatus, so that can bodies can be produced at a markedly decreased cost.

Another object of my invention is to provide a novel method and apparatus for making can bodies which will make possible the utilization of untinned steel sheet in such a way that the speeds of operation will be comparable with or superior to the present day methods of operation wherein the tinned steel sheet is used while the cost of production will be materially reduced.

Another object of my invention is to provide a novel method and apparatus of such a nature that the use of both tin and solder may be obviated in the making of can bodies while, at the same time these can bodies will be as good or better than those can bodies commonly being made at the present time by the use of tin plate and solder.

In the preferred embodiment of my invention, I have departed from the prior art method of making can bodies which consists in joining the ends of a metal blank to form the side seam of the can. Instead, I have adopted a method wherein the can bodies are formed from a relatively prolonged strip whose side edges are joined to form the side seams of a plurality of can bodies which are cut to length from a tube produced by the joining of the side edges of such strip. In other words, instead of cutting a series of can body blanks from a sheet of metal and then joining the ends of said blanks to form the side seams of the can bodies, I join the side edges of a prolonged strip to form a tube and then cut the tube into lengths to form a multiplicity of can bodies.

Moreover, my invention preferably contemplates the joining of the side edges of my prolonged strip of material by passing such prolonged strip of material continuously through rolls and cooperative mechanism effective to convert such strip into tubular form and, simultaneously with such continuous conversion of such strip into tubular form, the automatic and continuous welding of the side edges of the strip as these side edges are brought into overlapping relation. This prolonged strip of material is of a width corresponding to the desired circumference of the can body plus the overlap desired for effective welding. The lap-welding of the edges of the said strip is preferably effected electrically.

The strip of metal which, in accordance with my method, is fed continuously to the forming rolls and thence to the welding apparatus is a black steel strip, that is, a steel strip of appropriate thickness which has not been tinned. The strip of black steel is mounted in the form of a coil in such a manner that it may be continuously fed to the forming rolls and welding mechanism to produce a tube of a length adequate for separation into a number of can bodies. This separation is preferably effected automatically by means of a rotating cutter mechanism which is automatically clamped upon the tube at appropriate intervals and which travels with such tube during the cutting operation, preferably being returned after such cutting operation to its initial position. This cutting mechanism may be so regulated as to cut lengths of the tube substantially identical with the desired can body lengths or it may be regulated to separate the tube into lengths suitable for separation into shorter lengths which correspond to the desired lengths of the can bodies. The can bodies finally formed may be utilized without tinning or other coating, though they may be lined with enamels or lacquers, as desired.

The preferred embodiment of the apparatus which I utilize in connection with the performance of my method is shown in the accompanying drawings wherein similar characters of reference designate corresponding parts and wherein.

In the drawings, the apparatus is shown as comprising a rectangular table 1 which is carried by supporting legs 2, both of which may be varied as to form as desired. At one end of this table, it is provided with upstanding bars 3 which carry, adjacent their upper ends, a transverse rod 4. This rod 4 is removably mounted so that it may be withdrawn and passed through the central opening of a coil of steel strip which is designated A. This coil of steel strip is preferably of a width corresponding to the circumference of the cans which are to be formed plus the overlap between the longitudinal edges of the strip. This strip may be of any desired thickness but is preferably approximately .01 of an inch in thickness, such as is ordinarily used in the making of cans from tin plate.

Figure 9:
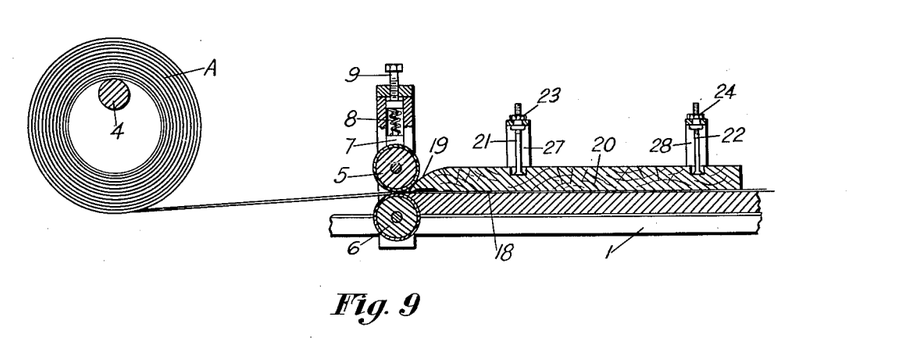
Figure 9 is an enlarged detail of the end of the apparatus which carries the rolled strip of steel, together with the rollers for feeding the said strip to the forming rolls and the several means provided to prevent buckling of the strip during this feeding operation.

As best shown in Figure 9, the table structure is provided with a pair of rubber-covered feeding rolls 5 and 6. The upper feeding roll 5 is preferably carried in journal bearings 7 that are resiliently forced downwardly by a spring 8 under the control of screw members 9. Obviously, other types of feeding rolls may be utilized if desired. The driving mechanism for such rolls is not shown but it will be understood that any suitable driving mechanism may be provided.

Figures 1, 2:
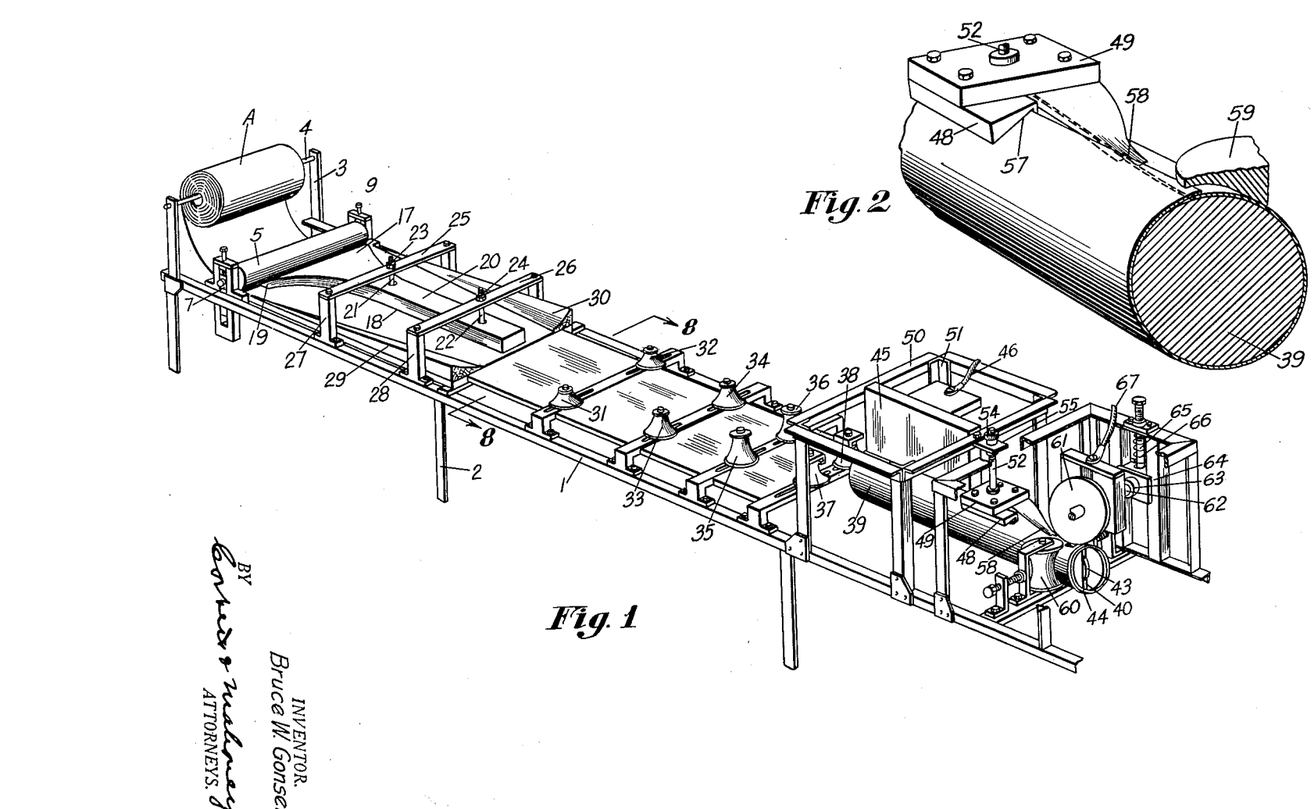
Figure 1 is a perspective view illustrating some of the features of an apparatus which I preferably use in forming and electrically welding the tubes which are to be subsequently separated into cylinders for the formation of can bodies.
Figure 2 is a perspective view of the section of steel strip which is partially formed, together with the mandrel over which it passes and the means for effecting and regulating the overlapping of the edges of the steel strip preliminary to the welding operation.

Immediately beyond the pair of feed rolls 5 and 6, the table 1 is provided with a superposed plate, shown best in Figures 1 and 9. This plate comprises a relatively wide member 17 which is spaced from the table as at 18 and which is downturned at its rear extremity as at 19 so that it bears upon the black steel strip immediately adjacent the roll 7. This portion 17 of the plate is further provided with a shank 20 which extends longitudinally of the table but is of substantially lesser width than the portion 17. It contacts with the steel strip at the approximate center thereof and is provided with upstanding bolts 21 and 22 threaded through adjusting collars 23 and 24. These collars are so mounted on cross bars 25 and 26 carried by standards 27 and 28 that the member 20 may be raised or lowered to exert more or less pressure upon the longitudinal center of the strip, which further tends to prevent buckling of such strip.

Along the edges of the table on both sides of the member 20 are ramps or inclined portions 29 and 30 which gradually increase in angle of inclination from the rear toward the forward end of the apparatus. This structure is such that the longitudinal edges of the sheet metal strip are gradually curled upwardly during their approach to the forming rolls.

As shown best in Figure 1, the forming rolls are arranged in pairs which may be respectively designated 31 and 32, 33 and 34, 35 and 36, and 37 and 38. The units of each of these pairs of rolls are adjustably mounted, as shown, so that they may be adjusted to compensate for variations in width. It will also be understood that any one or more of these pairs of rolls may be power-driven, if desired, to assist in effecting the travel of the sheet metal strip through the apparatus.

Figure 3:
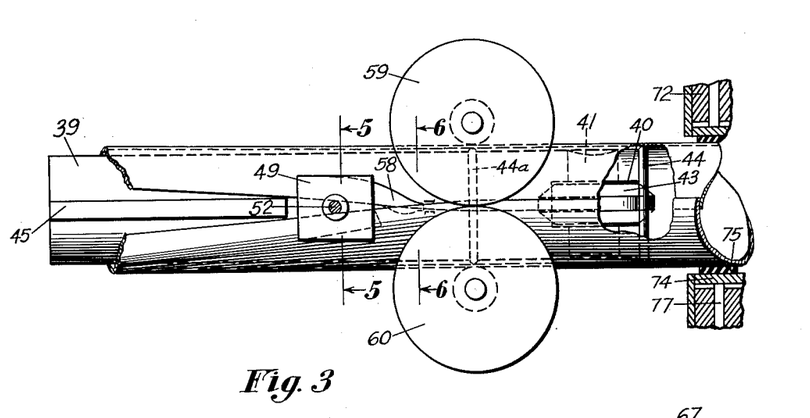
Figure 3 is an enlarged plan view of a portion of the apparatus shown in Figure 1 and illustrating the manner in which the edges of the bent plate are gradually forced together and into overlapping relation.
Figures 4, 5, 6:
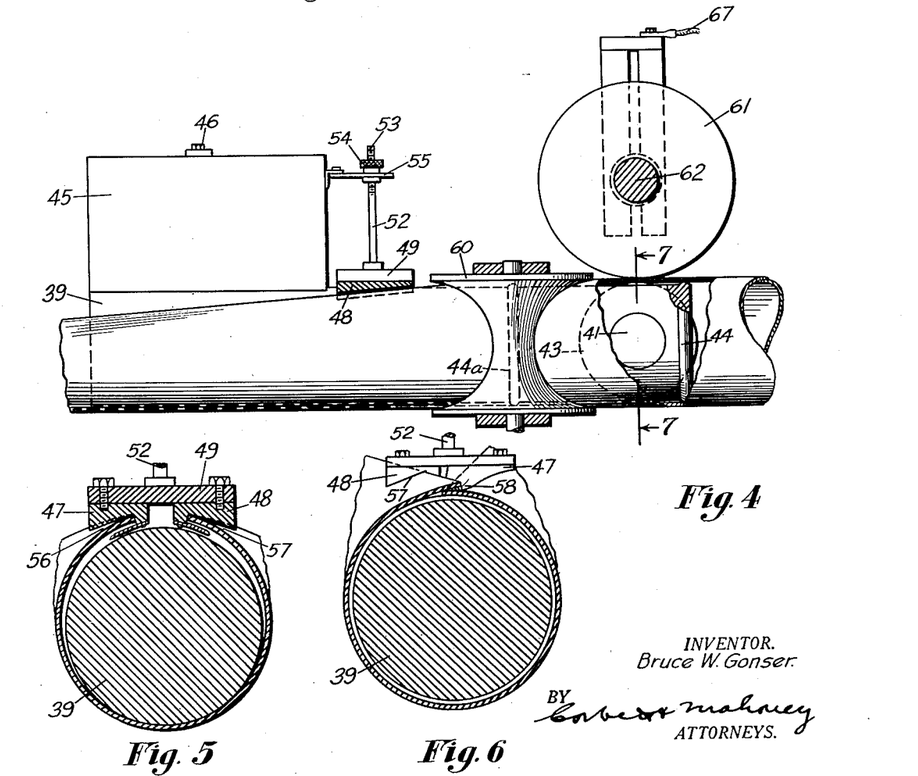
Figure 4 is a side elevation of the structure shown in Figure 3.
Figure 5 is a section taken on line 5—5 of Figure 3, looking in the direction of the arrows.
Figure 6 is a section taken on line 6—6 of Figure 3, looking in the direction of the arrows.

Immediately beyond the rolls 37 and 38, the apparatus is provided with a mandrel 39 which is designed to be embraced by the upwardly bent metal strip. This mandrel is of cylindrical form and is of slightly less diameter than the internal diameter of the tube being formed. It is preferably of solid copper or copper alloy and is provided at its forward end with a vertical slot 40, as shown in Figures 3 and 4. Mounted in this vertical slot through the medium of cylindrical trunnions 41 fitting in cylindrical bearing sockets 42 in the vertical walls of said socket is a copper alloy electrode wheel 43 which forms the inner electrode designed for cooperation with an outer electrode to be described. The forward end of this mandrel is reinforced by a ring or ferrule 44 which may be of steel or other metal and which is preferably more wear-resistant than the copper or copper alloy of which the mandrel is formed. This ring carries an annular rib which maintains the inner diameter of the tube. Adjacent its rear end, the mandrel is provided with an upstanding plate of copper or copper alloy 45 to which current is supplied by means of the connection 46. The mandrel 39 also carries a ring 44a which cooperates with rolls to be subsequently described in determining the inner diameter of the tube.

Immediately in front of the plate 45 elements are provided for guiding the edges of the sheet into overlapping relation. These elements comprise opposing members 47 and 48 which are supported by a plate 49 to which they are bolted. This plate 49 may be mounted upon a framework 50 which is of rectangular form and which is carried upon the table 1 by standards 51. The plate 49 may be mounted in any desired manner but, in the form shown, it has an upstanding rod 52 which is threaded as at 53 through a collar 54 that is carried in plate 55. The structure is such that the plate 49 may be raised or lowered as desired.

The members 47 and 48 are preferably spaced apart and are provided on their outer sides with grooves 56 and 57, respectively, so that the approaching edges of the curled steel strip may enter these grooves. By reference to Figure 3, it will be seen that the bases of these grooves converge towards each other so that the opposing edges of the steel plate strip are guided towards each other as a preliminary to the bringing of such edges into overlapping relation.

The means for insuring that the opposing edges of the steel plate will be brought into overlapping relation as they leave the opposing members 47 and 48 is illustrated best in Figures 1, 2, 3 and 6. This means comprises a tapered knife-like finger 58 which is designed to bear downwardly upon the portion of the plate which is to form the lower layer of the overlapped seams. This knife-like finger has its under surface so located that it forms a substantial continuation of the upper wall of the groove 57 so that the edge of the plate which travels in said groove is automatically conducted into position beneath said knife-like finger. The groove 56, however, is so constructed that the edge of the steel plate which travels therethrough is delivered onto the top surface of the said knife-like finger, as illustrated in Figures 3 and 4.

Immediately beyond the said knife-like finger, the steel strip, which has at this point attained tubular form, passes through opposing side rolls 59 and 60 which are so grooved that they substantially enclose the tube for maintaining the overlapped edges in proper overlapping relation. These side rolls 59 and 60 may be power-driven, if desired, and they are the rolls which cooperate with the ring 44a for determining the diameter of the tube.

Figures 7, 8:
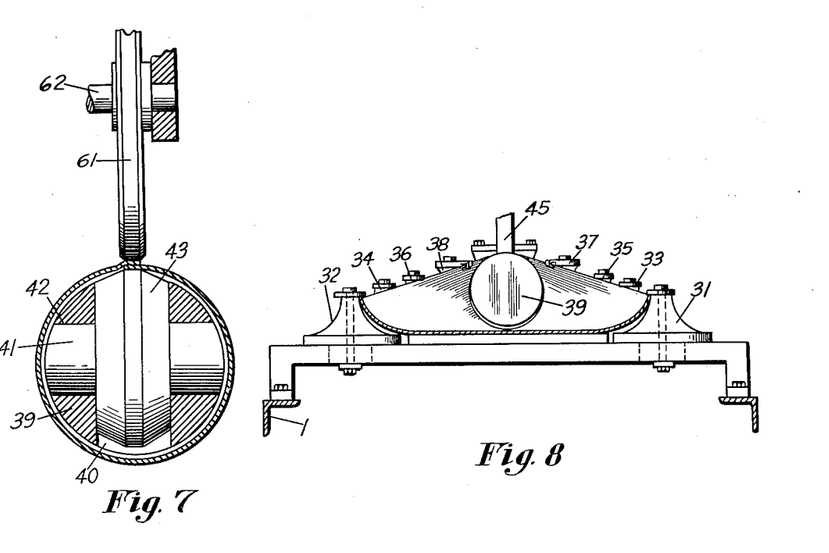
Figure 7 is a detail in section illustrating the inner and outer electrodes and the manner in which they operate upon the overlapping edges of the sheet to weld them together.
Figure 8 is a section taken on line 8—8 of Figure 1, looking in the direction of the arrows.

It will be apparent that the electrode wheel 43 is disposed immediately beyond these side rolls 59 and 60 in the path of travel of the metal sheet and is so located that it bears firmly against the under side of the overlapped seam and rotates in a plane substantially coincident with the longitudinal vertical plane through said overlapped seam. Designed for cooperation with this inner electrode 43 is an outer electrode 61, which takes the form of a disk which may be of any suitable material and is preferably of substantially larger diameter than the electrode 43. The electrode disk 61 is rotatably carried by a shaft 62 which is journaled in vertically movable bearings 63. These bearings 63 are vertically adjustable in slideways 64 and carry upstanding rods 65 which are surrounded by coil springs 66 which are operative to resiliently force the bearing members downwardly to hold the electrode disk 61 in firm but yielding contact with the upper side of the overlapped seam and in such position that its plane of rotation is substantially coincident with the longitudinal vertical plane through the overlapped seam. Current may be supplied to the electrode disk 61 by any desired type of connections, as diagrammatically illustrated at 67.

A means for separating the formed tube into sections is best illustrated in Figures 10 to 13, inclusive. In these figures, it will be seen that this means for separating the tube into sections comprises a carriage 68 having rollers 69 designed to run on tracks 70. This carriage 68 is provided with four spaced standards 71 which carry a body portion 72 provided with an aperture 73 through which the formed tube is designed to pass immediately after it leaves the electrodes which have effected the welding thereof.

Figures 10, 13:
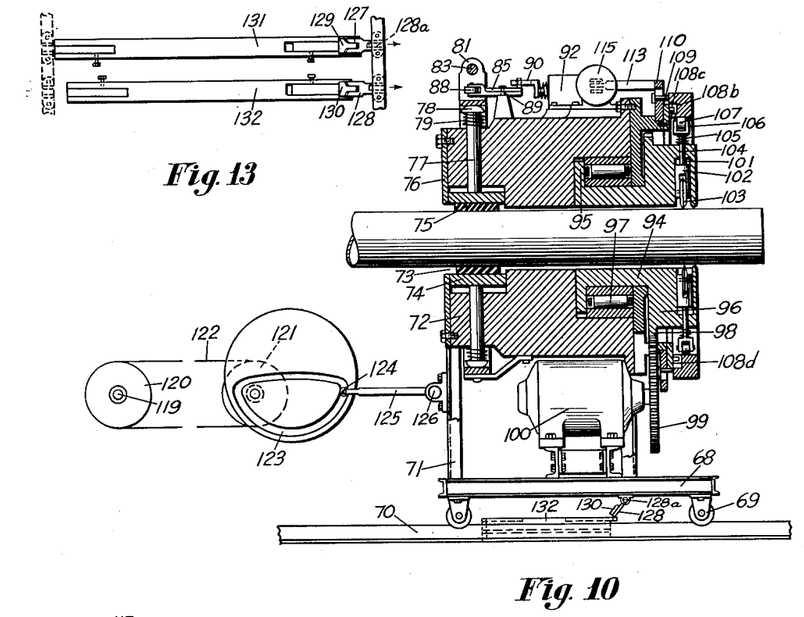
Figure 10 is a vertical longitudinal section of an apparatus for effecting separation of the formed tube into smaller lengths, such as can body lengths, together with a diagrammatic showing of means for effecting the operation of this apparatus in synchronization with the rolls for feeding the strip.
Figure 13 is a detail, in plan, of the contact track members which I may utilize for actuating the tube gripping means and for rendering the cutter members effective.

The body portion 72 is provided at its receiving end with a tube-clamping means embodying shoes 74 provided with rubber linings 75 and normally retained within the body portion by a removable annular plate 76. Each shoe is preferably of arcuate form and is provided with a cylindrical rod 77 that extends radially outward through the body portion and carries a head 78 at its outer extremity. Surrounding each rod 77 and disposed between the head 78 thereof and the body portion 72 is a coil spring 79 which normally tends to hold each shoe away from contact with the tube passing through the body portion.

Figures 11, 12:
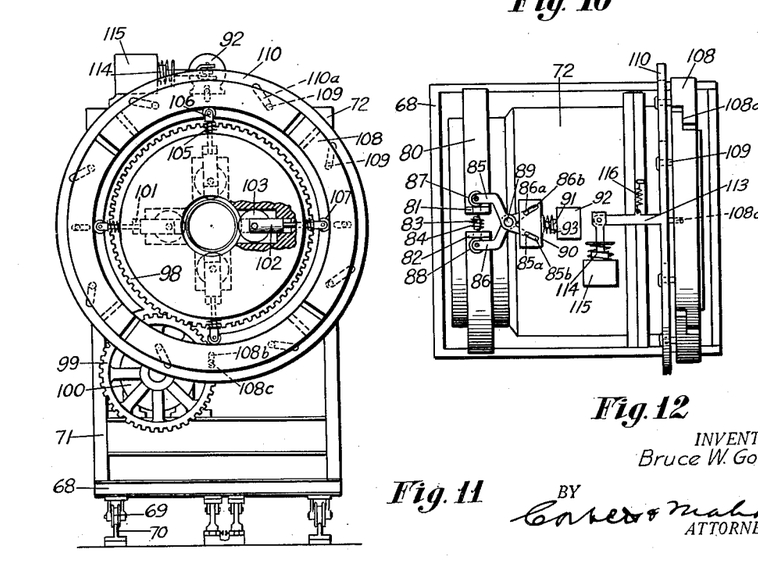
Figure 11 is an elevation of the structure shown in Figure 10, looking from the right thereof.
Figure 12 is a plan view of the principal portion of the apparatus shown in Figure 10.

The outer surfaces of the heads 78 of the rods 77 normally lie in contact with the inner periphery of an expansible and contractible band 80. This band 80 is preferably formed in one piece with its extremities spaced apart as shown in Figure 12 and provided with upstanding integral flanges 81 and 82. Extending through these spaced integral flanges is a pin 83 which carries a coil spring 84 which is disposed between the flanges and which normally tends to hold such flanges apart so that the band 80 exerts no operative pressure upon the heads 78 of the rods 77.

Disposed in cooperative relation with these flanges 81 and 82 is a toggle mechanism which comprises levers 85 and 86 having rollers 87 and 88 which bear upon the outer surfaces of these flanges. These levers 85 and 86 are fulcrumed as at 89 and their outer extremities carry upstanding pins 85a and 86a which extend into slots 85b and 86b formed in a plate 90. The plate 90 is connected to the core 91 of the solenoid 92, which core is normally held extended by a coil spring 93 but is designed to be retracted upon the energization of the solenoid 92. It will be apparent that the energization of the solenoid 92 will operate, through the actuation of the plate 90 and the consequent movement of the rollers 87 and 88 towards each other, to contract the band 80 and, consequently, to force the rods 77 inward so that the shoes 74 grip the tube passing through the body portion of the apparatus.

At the delivery end of the body portion 72, a constantly rotating cutting mechanism is provided. This constantly rotating cutting mechanism comprises a sleeve 94 having a flange 95 on its inner end and having a flange 96 on its outer end. The sleeve is mounted upon the body portion by roller bearings 97 and the flange 96 of this sleeve carries a gear 98 which meshes with a gear 99 designed for constant rotation by a motor 100 which is carried upon the carriage 68.

The flange 96 is also provided with radial sockets 101 in the inner face thereof for the reception of piston members 102 whose inner ends carry rotatable cutter wheels 103. The outer ends of these pistons 102 are provided with stems 104 which extend through the outer periphery of the flange 96 and are surrounded with coil springs 105 bearing against the outer periphery of the said flange at one end and bearing at the other end against yokes 106 which carry rollers 107. These rollers 107 bear against the inner periphery of a split band or track which is formed in four sections 108 having L-shaped overlapping ends 108a.

Each of the shoe sections 108 is provided in its rear side with a radial socket 108b for the reception of a pin 108c, these pins 108c being carried upon a ring 108d which is fixedly mounted, so that these pins will prevent rotation of the said split band or track, though permitting radial movement of the sections thereof.

Each shoe is also provided on its rear face with a pair of rearwardly extending pins 109 which operate in cam slots 110a of a ring 110 that is mounted for limited oscillation by a solenoid to be described, so that the sections of the band may be moved radially inward to render the cutting members effective or withdrawn to render them ineffective. The pins also serve to hold these band sections in position as an assembled unit.

The structure is such that the pistons 102 are normally held retracted so that the cutter wheels 103 do not make contact with the tube passing through the body portion 72 of the apparatus. They may be caused to make such contact to effect cutting of the tube by means of a structure shown best in Figures 12 and 13. This structure comprises a rigid arm 113 which extends rearwardly from the ring 110 and has a loose slot-and-pin connection to one end of the core 114 of a solenoid 115, which is normally held in extended position by a spring 116. The structure is such that energization of the solenoid 115 will retract the core 114 and effect partial rotation of the ring 110. This will result in travel of the pins 109 in the cam slots 110a and towards the innermost ends thereof with the result that the band sections 108 are forced inwardly and, in turn, bear against the rollers of the cutter members and force such cutter members into operative contact with the tool. De-energization of the solenoid 115 permits the spring 116 to return the cam ring to initial position and effect withdrawal of the cutter members out of operative relation to the tube.

This means for separating the tube into sections is controlled by movement of the carriage 68 which is caused to travel with the tube during the cutting operation and, as a result of such movement, to close the circuit for operating the solenoids to effect clamping of the tube and operation of the cutter unit. The tube is being fed continuously at a selected rate by means of the feed rollers 5 and 6 through the medium of a driving shaft which is not shown. The same driving shaft is utilized for effecting movement of the carriage 68. Through apparatus, not shown, this driving shaft is used to drive a shaft 119 carrying a pulley 120 which in turn drives a pulley 121 by means of a chain 122. This pulley 121 carries a cam 123 which is shown diagrammatically and which cooperates with roller 124 on one end of a link 125. The link 125 is pivoted as at 126 to the carriage 68, so that the rotation of the cam 123 serves to move the carriage 68 intermittently for a short distance in the direction of movement of the tube and, after each movement, to return this carriage to its initial position.

The carriage 68 is provided on its lower surface with contact members 127 and 128 which are pivoted as at 128a. The contact members 127 and 128 are provided with insulating blocks 129 and 130 and are designed to cooperate with contact strips 131 and 132, the contact member 127 and contact strip 131 controlling the operation of solenoid 92 and the contact member 128 and contact strip 132 controlling the operation of solenoid 115. The contact strip 131 projects beyond the contact strip 132 at both ends. Both strips are adjustable as to length as shown in Figure 13. The wiring diagrams are not shown and are deemed unnecessary because the manner of operation will be readily apparent.

Starting with the apparatus of Figure 10 at its extreme left hand position, the movement of the carriage 68 towards the right will first cause the contact 127 to close the circuit through the contact strip 131 and this will result in energization of the solenoid 92 which will actuate the band 80 to cause the shoes 74 to grip the tube being fed through the apparatus. Shortly thereafter, the contact member 128 will close the circuit through contact strip 132 which will result in energization of the solenoid 115 which will bring about movement of the cam ring 110 and consequent movement of the cutting wheels 103 into contact with the tube so that cutting of this tube will be effected, in view of the fact that these cutter wheels are being caused to move continuously in a circular path by the rotating sleeve 94. This position of the clamping shoes and the cutter wheels will be maintained until the contacts 127 and 128 pass beyond the ends of the contact strips 131 and 132. The contact 128 will pass beyond the contact strip 130 first so that the solenoid 115 will first be de-energized and the cutter pistons be released so that the cutters will withdraw to inoperative positions. Immediately thereafter, the contact 127 will pass beyond the contact strip 131 so that the solenoid 92 will be de-energized with the result that the clamping shoes 74 will be withdrawn to inoperative position. Then, movement of the carriage towards the right terminates and it starts to return to its initial position. During this return, the insulating blocks 129 and 130 ride upon the contact strips 131 and 132 and prevent the contacts 127 and 128 from closing the circuits through the solenoids 92 and 115. The movement of the carriage towards the left is continued until the contacts 127 and 128 reach the dotted line positions shown in Figure 13. It will be obvious that suitable adjustments may be provided for varying the length of movement of the carriage as well as for varying the periods of operation of the clamping and cutting units both with relation to each other and independently.

Though I have described the means for separating the tube into lengths as comprising a plurality of radially disposed cutter members carrying disks which are rotatably mounted but not positively driven, it is within the scope of my invention to utilize cutting members which carry positively driven cutters that may be effective to separate the tube into lengths by what may be termed a sawing action. For example, these disks may take the form of members having abrading edges such as would be produced by the use of carborundum or other abrading materials.

Likewise, it will be understood that it is within the scope of my invention to separate the tube into units of a length corresponding to a number of can bodies and to then separate such lengths into units of can body lengths by mounting them upon a mandrel and cutting them by a gang cutter which may embody a plurality of spaced disks or other cutting elements, either by rotating the tube and the disks simultaneously or by causing one to travel around the other.

Other methods will suggest themselves for effecting the cutting off operation. I may use internal expanding cutters working on a reciprocating mandrel inserted in the tube and moving with it during the cutting operation. Such cutters would also operate in conjunction with a sleeve to give a shearing cut. Or I may use shearing disks operating in a spiral groove cutting into the welding mandrel, said disks being synchronized with the motion of the tube.

In the operation of this preferred type of apparatus, clean black steel strip that has been preferably annealed is mounted on the rod 4, as shown at A in Figure 1. This steel strip has been preferably skin rolled to prevent fluting or imperfect bending and, as indicated above, its width corresponds to the circumference of the can bodies to be formed plus the amount of material desired to form the overlap. The free end of the strip A is then led between rolls 5 and 6. Leaving rolls 5 and 6, it passes beneath the portion 17 of the central plate shown in Figures 1 and 8 and thence beneath the relatively narrow portion 20 of this plate. As it progresses beneath the plate 20, its edges are slightly and gradually curled upwardly by the ramps 29 and 30. Upon leaving these ramps, this strip is progressively curled by successive pairs of rolls 31 and 32, 33 and 34, 35 and 36, and 37 and 38. Leaving the roll 38, it moves into embracing relation to the mandrel 39 until its edges enter the grooves 56 and 57 and pass under subjection to the knife-like finger 58. Leaving the knife-like finger 58, in properly overlapped relation, the overlapped seam thus formed passes under subjection to the electrodes 43 and 61, being held in proper relation by the rolls 59 and 60 and supported internally by the rings 44 and 44a. These electrodes effectively weld the seam and the tube then passes to the means for separating it into sections which is illustrated in Figures 10 to 13, inclusive.

As the welded tube passes through the means for separating it into sections, the separating mechanism operates intermittently to travel with the tube for a short distance and then return to initial position. During each movement of the carriage 68 in the direction of travel of the tube, the clamping shoes first grip the tube and then the cutting units sever a length therefrom, after which the cutting units are withdrawn, the clamping means is released and the carriage is returned to initial position. The severed lengths of the tube may be removed in any desired manner to any desired point for subsequent operation.

The welding electrodes may take various forms. As shown, they consist of a relatively small disk or rotating member 43 of copper or copper alloy which is mounted in the mandrel 39 which is formed entirely of copper or copper alloy and a relatively large disk of copper or copper alloy which is mounted in a floating housing and which is so arranged that it will hold the lapped seam firmly against the inner electrode. These electrodes are preferably made of a highly conductive, hard, wear-resistant copper alloy. The inner electrode may be cooled by means of a hollow, relatively large, water cooled spindle. Its bearing surface may be fairly broad and curved to fit the contour of the can being welded. The outer electrode is preferably larger and air cooled. Its bearing surface tapers to a narrow edge, as 0.03–0.2″ in breadth, in order to localize the welding seam to a narrow line. By a system of weights or springs bearing against the floating housing, the outer electrode may be forced against the seam at any desired pressure.

As shown, an annular rib or bearing ring is attached to the forward end of the mandrel, just beyond the point of welding, to aid in maintaining the shape of the tube and prevent distortion. Auxiliary drive rolls may operate against the tube adjacent the said rib or ring, if desired, to assist in pulling the strip through the apparatus, after it leaves the main drive rolls.

As indicated above, devices may be used to cut sections of can lengths directly from the tube as it is being fed continuously. Slight distortion of the can bodies at the cut ends and at the welded seam may be readily removed by the use of well known can manufacturing machinery, such as those devices known as "flexor-flangers".

Many adjustments, not shown in the drawings, are desirable for convenient flexible operation of my welding apparatus and to quickly adapt it to different sizes or shapes of cans. Such mechanical adjustments, or changes, it will be readily understood, are alternative ways of accomplishing the same general method of can body making. The mechanical arrangement described is to be considered as illustrating the general arrangement only and the same principle utilized in adapting the machine to the making of other sizes and shapes of cans.

The source of electrical energy used in welding cans in this manner depends on the speed of welding. In the early experimental work leading to this invention, ordinary 60-cycle alternating current from a suitable low voltage transformer was used. This was satisfactory for continuous welding up to a speed of about 30 ft. per min., at which speed the center of welded spots (corresponding to crests in the alternating current) are 0.05 inch apart. At this or higher speeds, a higher frequency than 60 cycles is desirable in order to assure a positive gas-tight seam without danger of overheating the centers of the points receiving maximum heat. Thus, while there is a minimum frequency that will give satisfactory results at a given speed, no limit need be set on the maximum frequency.

For normal practical purposes of making a gas-tight weld, a frequency of from 2 to 6 times the speed in ft./min. is desirable. At a speed of 60 ft./min., corresponding to a production rate of about 150 No. 2 can bodies per min., for example, a frequency of 180 cycles A. C. is quite satisfactory. For some containers where a gas-tight seam is not essential, a relatively low frequency may be maintained even at high speeds. Very satisfactory homogeneous tight seams are obtained at very high frequencies, but as the cost of such equipment is higher than that of 60-500 cycle current, the later is considered the most practical range. Use of direct current is not outside the scope of this patent although it has not been found quite as satisfactory to control as A. C. Likewise, rectified alternating current may be used although the necessary rectifying equipment is more costly than alternating current equipment.

The speed of can body making by this method may be equally as fast as that used in present commercial manufacture of sanitary cans with soldered seams, i. e. up to 150-300 No. 2 can bodies per min., equal to 60-120 ft./min. of continuous welded tube. A speed of less than 20 ft./min. is scarcely to be considered commercial except for special shapes and sizes.

For most purposes of can making, mild steel strip of about .01″ thickness is used and this presents a somewhat different problem from the problem of rapidly welding heavy steel tubing. This thin material requires support from the inside for welding and, therefore, the common methods of continuous tube welding by means of two external electrodes, as ordinarily used, is not applicable to this thinner material.

The width of lap at the seam is preferably kept small in order to make a neat joint and to conserve material. I have found a lap of only 0.03-0.1 inch to be ample. The pressure of the electrodes and the thinness of the material makes a tight joint with a scarcely noticeable offset at the edge. A lap joint is preferred to a butt joint not only because it is made in a much simpler, more positive manner without danger of leaving local pinholes but, due to the thinness of the material, the lap joint of perhaps 0.05 in. width is much stronger than a butt joint of but 0.01 in thickness.

Power consumption in rapid continuous welding of can body stock by this method is relatively low since the strip being joined is very thin. As an operating example, a coil of steel strip of 0.009-0.0095″ thickness was continuously converted into excellently welded can body tubing at the rate of 32 ft. per min. with the expenditure of 3000 amperes at 1.5 volts at the machine. By increasing the speed, somewhat more power was required but not materially in excess of the ratio of speed to power.

It will be seen from the above that I have provided a novel method and apparatus which permits the formation of tin cans continuously from a progressively fed strip of black steel plate. Since the longitudinal edges of this continuous strip of metal are joined by welding, the undesirable use of solder is avoided and it becomes unnecessary to resort to the preliminary step of tinning the metal. Since, at the present time, black steel strip is only about one-half the cost of tin plate, an immediate saving results therefrom and a further saving results from the fact that it is not necessary to use solder.

Eliminating the necessity for the use of tin and solder is also advantageous because of the fact that these materials are considered to be essential war materials. Advantage is also gained from the omission of the use of solder because of the removal of all danger from lead poisoning.

Further important advantages result from the great simplification of the apparatus required for can formation. The discussion of the prior art set forth at the beginning of this specification describes many relatively complicated units which are rendered unnecessary by my invention.

The speed at which we have operated in experimental runs has been at the rate of 75 to 80 No. 2 can bodies per minute and, with a higher frequency in the welding current used, this speed can be made much greater, yet a satisfactory gas tight weld secured. Thus, this development has brought can welding into the field of practical commercial rates of production.

It will be understood that my method is not necessarily limited to the making of cans which are circular in cross-section. It is applicable to the making of cans of rectangular or other cross-sections.

It will likewise be understood that my tube may be formed by other means than forming rolls. Thus, dies or other bending surfaces or grooves may be used if desired.

The cost of electricity for resistance welding amounts to only a few cents per thousand cans and is negligible in comparison to the above savings. Other manufacturing costs caused by welding in place of soldering and using more protective enamel coatings than commonly used are estimated as covering only a small fraction of the saving represented.

The welded seam is stronger than a soldered seam, hence the finished product will be superior also from the standpoint of sturdiness.

Having thus described my invention, what I claim is:

1. The method of making cans which comprises feeding continuously a strip of steel of a width approximating the circumference of the can body and of a length sufficient to form a plurality of can bodies, continuously forming the steel strip into substantially tubular form as it is progressively fed and causing the edges thereof to overlap, continuously welding the overlapping edges as the tubular member is progressively fed, and dividing said tubular member into a plurality of can bodies during the progressive feeding of said tubular member.

2. The method of making can bodies, which comprises continuously feeding a thin strip of steel of a width approximating the desired circumference of the can bodies and of a length sufficient to form a plurality of can bodies, continuously forming the steel strip into substantially tubular form as it is progressively fed, and thereby bringing its edges adjacent, continuously welding the adjacent edges as the tubular member is progressively fed, and dividing said tubular member into a plurality of lengths during its progressive feeding.

3. The method of making can bodies, which comprises continuously feeding a thin strip of steel of a width approximating the desired circumference of the can bodies and of a length sufficient to form a plurality of can bodies, continuously forming the steel strip into substantially tubular form as it is progressively fed, and causing its edges to overlap, continuously welding the overlapping edges as the tubular member is progressively fed, and dividing said tubular member into a plurality of lengths during its progressive feeding.

4. The method of making can bodies from coiled strips of thin steel of a width approximating the desired circumference of the can bodies, comprising continuously unrolling coiled steel strip of said width and of a length sufficient to form a plurality of can bodies continuously feeding said strip and forming it into substantially tubular form as it is progressively fed, thereby bringing the edges adjacent, continuously welding the adjacent edges as the tubular member is progressively fed, and dividing the welded tubular member into a plurality of lengths during its progressive feeding.

5. The method of making can bodies, which comprises continuously feeding a thin strip of steel of a width approximating the desired circumference of the can body and of a length sufficient to form a plurality of can bodies, continuously forming the steel strip into substantially tubular form as it is progressively fed, and causing the edges to overlap, continuously welding the overlapping edges as the tubular member is progressively fed, dividing the welded tubular member into a plurality of lengths longer than an individual can body during its progressive feeding, and subsequently dividing said lengths to form can bodies.

BRUCE W. GONSER.